UNITED STATES PATENT OFFICE.

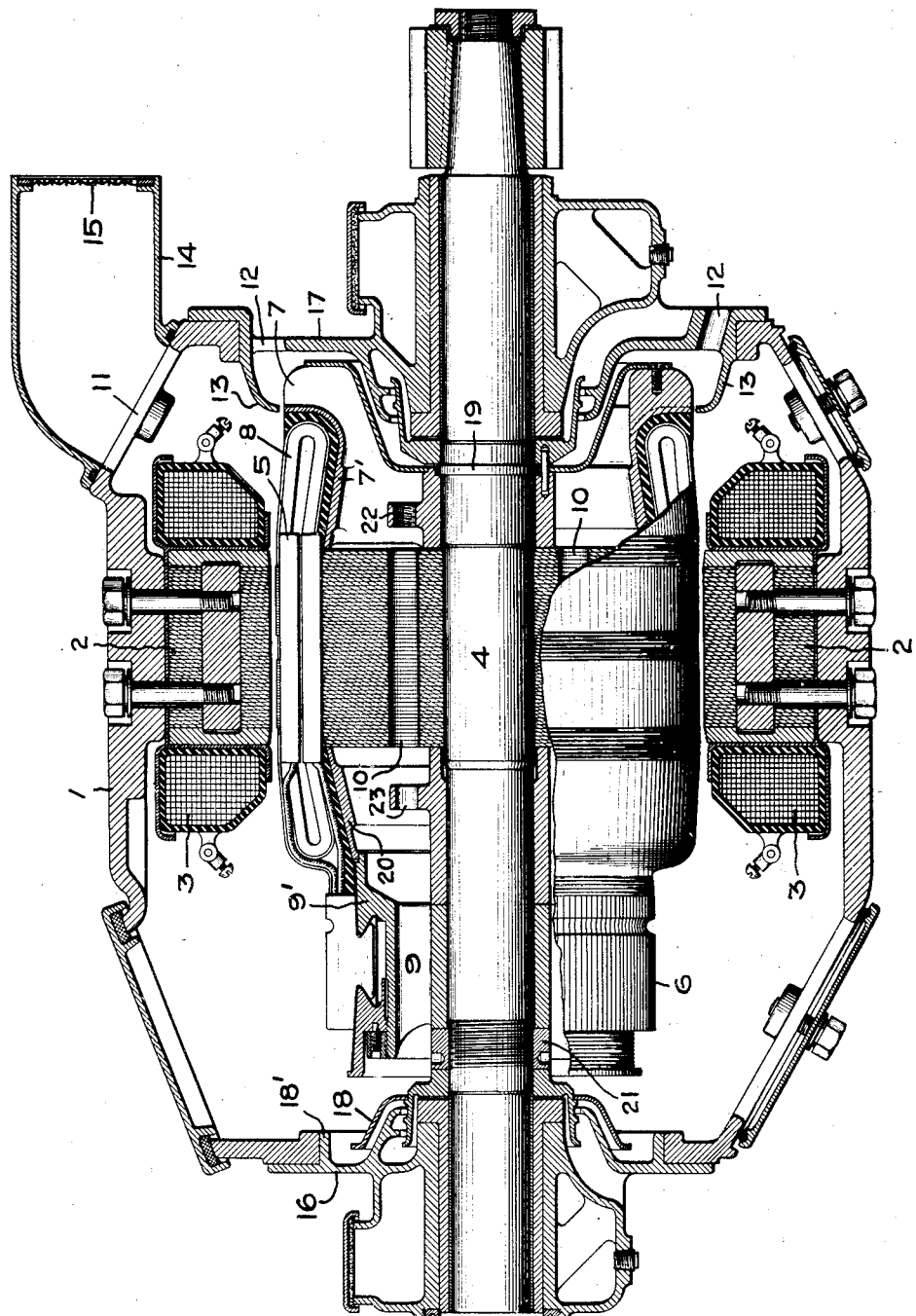

EDWARD D. PRIEST, OF SCHENECTADY, NEW YORK, ASSIGNOR TO GENERAL ELECTRIC COMPANY, A CORPORATION OF NEW YORK.

DYNAMO-ELECTRIC MACHINE.

1,222,464. Specification of Letters Patent. Patented Apr. 10, 1917.

Application filed January 18, 1912. Serial No. 671,903.

*To all whom it may concern:*

Be it known that I, EDWARD D. PRIEST, a citizen of the United States, residing at Schenectady, county of Schenectady, State of New York, have invented certain new and useful Improvements in Dynamo-Electric Machines, of which the following is a specification.

My invention relates to dynamo electric machines of the inclosed type, such for example as railway motors, and has for its object to provide an improved ventilating arrangement for such machines, whereby all portions of the machine are efficiently cooled.

To this end, my invention consists in certain novel features of construction and arrangement of parts hereinafter described and particularly pointed out in the claims.

For a better understanding of my invention and the various advantages possessed by it, reference may be had to the following description taken in connection with the accompanying drawing in which the single figure is a longitudinal cross section of a railway motor embodying my invention.

In the particular motor construction shown in the drawing, the inclosing casing 1 of the motor forms part of the field magnet circuit and has field poles 2 mounted therein in any well known manner, these field poles being surrounded by suitable field windings 3. A shaft 4 is journaled in bearings in the casing 1, and has mounted thereon an armature 5 provided with a commutator 6 which together constitute the rotating element of the motor. The armature, I construct of laminations which are closely pressed together without any radial ventilating spaces between the same, and for ventilating the motor I provide air passages 9 and 10 extending longitudinally through the armature laminations and the commutator structure and I provide the casing with inlet and outlet openings 11 and 12, both at the same end of the motor, the outlet opening being separated from the inlet opening by suitable means such as a diaphragm or flange 13 which projects from the motor casing into close proximity with a corresponding member or flange 7' carried by the armature shaft. By means of a suitable fan I cause the air for cooling the motor to enter the casing through the inlet opening, and to flow in a single stream both through the armature and commutator structure and over the surfaces thereof and around the field windings and to be discharged through the outlet opening. In the particular arrangement shown the air for cooling the dynamo electric machine enters the casing adjacent the field windings so that it flows first around the field windings and over the surfaces of the armature and commutator from whence it passes through the air passages extending longitudinally through the armature laminations and commutator structure and out at the discharge openings. For forcing the ventilating air through the motor I prefer to employ a fan of the exhaust type located at the end of the armature away from the commutator and between the outlet opening and the air passages through the armature laminations and the commutator structure, and when thus located, I may construct the fan member by providing vanes 7 on an end head 7', which supports the armature windings 8 at the end of armature which is away from the commutator, so that the core head acts as a centrifugal blower. The longitudinal air passages extending through the commutator structure and the armature laminations are indicated by the numerals 9 and 10 respectively. These passages taken together form a continuous air duct which in the arrangement shown is connected at one end with the interior of the motor casing, and at the other with the intake chamber of the fan. The air passages are formed in the commutator shell 9' between the sleeve by which the commutator shell is supported on the armature shaft and the outer surface of the shell on which the commutator segments are mounted, but the air passages for ventilating the armature are formed in the body of the armature laminations so as to bring the cooling air into the most effective relation to the armature structure.

One great advantage of my improved ventilating arrangement is that all parts of the dynamo electric machine are effectively cooled by a current of air drawn from outside of the motor, which in its circulation passes in a single stream both over and through the rotating parts of the machine and also over the field windings. As explained above, the current of air is drawn from outside the motor over the field windings, over the exterior surfaces of the armature and commutator and is discharged through the air duct which passes under the commutator and the end windings at the commutator end, through the core of the armature, and under the end windings at the end away from the commutator. My improved ventilating arrangement does not require any radial ducts in the armature core, and therefore makes it possible to use a very solid core construction. Moreover the circulation of air both over and under the armature along its whole length effectively cools every portion of it and avoids any possibility of hot spots in the windings.

The air from outside is taken through a simple opening in the motor frame or through a short pipe 14 extending a little beyond the side frame of the truck on which the motor is mounted. As shown, the pipe 14 may be provided with an air filter 15.

The casing 1 comprises a field magnet frame to which the field poles 2 are bolted, and removable end frames 16 and 17, which contain the bearings in which the armature shaft 4 is journaled. The outlet opening or openings 12 are formed in the end frame 17 and the flange 13 which separates the outlet opening from the inlet opening is preferably carried by this end frame so that it is removed therewith. The bearing in the end frame 16 is provided with a shield 18 to prevent lubricant from being withdrawn from the bearing. This shield is bent away from the commutator and consequently the velocity of the air passing the outwardly extending ends of the shield is less than the velocity of the air entering the commutator. There will be very little tendency therefore to draw any oil from the bearing past this shield. If any oil is drawn out of the bearing it will be thrown off of the shield 18 by its rotation against the flange or ring 18' on the end frame 16 and will then find its way to the bottom of the motor casing.

I have shown the armature laminations as punched out so that they fit snugly upon the shaft 4. When the armature is assembled on the shaft, the end head 7' abuts against a shoulder 19 on the shaft, and the laminations are held between the end head 7' and the end head 20. The commutator shell 9' abuts against the end of the end head 20 near the shaft. The outer portion of the end head 20 overlaps the outer portion of the commutator shell, thus making a joint through which air and dirt can not be drawn, and which also centers the commutator shell. The shell 9' is engaged by a nut 21 screw threaded upon the armature shaft, so that upon turning this nut, the armature is tightly clamped between it and the shoulder 19. In order to remove the armature from the shaft without disarranging its parts, such as the connections of the armature winding to the commutator, I have shown the end head 7' provided with screw threaded sockets 22 and the end head 20 with sockets 23 so that suitable fastening means, such as bolts, may be inserted through the ventilating passages 9, the sockets 23, the ventilating passages 10 into the sockets 22, to temporarily clamp the parts together independently of the shaft. The shaft may then be forced out leaving the armature and commutator rigidly connected together. The connection between the heads of the bolts and the commutator shell may be effected in any suitable way, such as by means of an auxiliary end head, as described in my prior patent for dynamo electric machines, No. 918,594, dated April 20, 1909.

What I claim as new and desire to secure by Letters Patent of the United States, is:—

1. In a dynamo electric machine, an inclosing casing provided with inlet and outlet openings therein at one end only, and with means for separating said openings, a field magnet provided with field windings, a shaft having bearings in said casing, an armature mounted on said shaft and provided with a commutator structure at one end, said armature and commutator structure having longitudinally extending air passages therethrough, and a fan member at the end of said armature away from said commutator structure and arranged to draw air into said dynamo electric machine through said inlet opening, over the field windings, over the exterior surfaces of the armature and commutator, through the longitudinally extending passages in the commutator structure and armature, and to exhaust the air out through said outlet opening.

2. In a dynamo electric machine, an inclosing casing provided with inlet and outlet openings therein at one end only, and with means for separating said openings, a field magnet provided with field windings, a shaft having bearings in said casing, an armature mounted on said shaft and provided with a commutator structure, said armature and commutator structure having longitudinal air passages extending therethrough, and an end head at the end of said armature away from said commutator for supporting the armature windings, said end head having vanes arranged to act as a centrifugal blower to draw air into said dynamo electric machine through the inlet opening, over the field windings, over the exterior surfaces of the armature and commutator, through the longitudinal passages in the commutator structure and armature, and to exhaust the air out through said outlet opening.

3. In a dynamo electric machine, an inclosing casing provided with inlet and outlet openings therein at one end only and with a diaphragm for separating said openings, a field magnet provided with field windings, a shaft having bearings in said casing, an armature mounted on said shaft provided with a commutator structure at one end, said armature and commutator structure having longitudinally extending air passages therethrough, and a fan member at the end of said armature away from said commutator structure and arranged to draw air into said dynamo electric machine through said inlet opening, over the field windings, over the exterior surfaces of the armature and commutator, through the longitudinally extending passages in the commutator structure and armature, and to exhaust the air out through said outlet opening.

4. In a dynamo electric machine, an inclosing casing provided with separate inlet and outlet openings therein at one end, a field magnet provided with field windings, a shaft having bearings in said casing, an armature mounted on said shaft provided with longitudinal air passages extending through the laminations thereof, a commutator structure at one end of said armature having air passages extending longitudinally therethrough and forming with the passages through the armature laminations a continuous air duct, a fan member arranged to draw air into said dynamo electric machine through said inlet opening, over the field windings, over the exterior surface of the armature and commutator, through said air duct and to discharge the air through said outlet opening, and means for separating said outlet opening from the inlet opening.

5. In a dynamo electric machine, an inclosing casing provided with separate inlet and outlet openings therein at one end, a field magnet provided with field windings, a shaft having bearings in said casing, an armature mounted on said shaft provided with longitudinal air passages extending through the laminations thereof, a commutator structure at one end of said armature having air passages extending longitudinally therethrough and forming with the passages through the armature laminations a continuous air duct, an exhaust fan located between said air duct and the outlet opening, and a flange on said casing coöperating with a member carried by said shaft to separate said outlet opening from the inlet opening.

6. In a dynamo electric machine, an inclosing casing comprising a field magnet frame and removable end frames, one of which is provided with an outlet opening, a shaft having bearings in said end frames, an armature mounted on said shaft having longitudinal air passages extending through the laminations thereof, a commutator structure at one end of said armature having longitudinal passages extending therethrough and communicating with the passages in said armature to form a continuous duct therethrough, windings for the field magnet and the armature, an exhaust fan having its intake chamber connected with said air duct and discharging through the outlet opening in said end frame, said motor casing having an air inlet opening at the end of said motor at which said fan is located, and a flange carried by said end frame coöperating with a member mounted on the armature shaft to separate said outlet opening from said inlet opening.

7. In a dynamo-electric machine, an inclosing casing provided with separate inlet and outlet openings therein at one end, a field magnet provided with field windings, a shaft having bearings in said casing, an armature mounted on said shaft provided with longitudinal air passages extending through the laminations thereof, a commutator structure at one end of said armature having air passages extending longitudinally therethrough and forming with the passages through the armature laminations a continuous air duct, an exhaust fan having its intake chamber connected with said air duct at the end of the armature away from the commutator and means interposed between said inlet and outlet openings for causing air to be drawn in through said inlet opening by the operation of said fan and to flow in a single stream both through said armature and commutator structure and over the surfaces thereof and around the field windings and to be discharged through the outlet opening.

8. In a dynamo electric machine, an inclosing casing comprising a field magnet frame and removable end frames, one of said end frames having an opening therein, said field magnet frame having an opening therein at the same end of the motor as said opening in said end frame, a shaft having bearings in said end frames, an armature mounted on said shaft having longitudinal air passages extending through the laminations thereof, a commutator structure at one end of said armature having longitudinal passages extending therethrough and communicating with the passages in said armature to form a continuous duct therethrough, windings for the field magnet and the armature, an exhaust fan having its intake chamber connected with said air duct, and a flange carried by the end frame which has an opening therein for causing air to be drawn through one of said openings by the operation of said fan and to flow in a single stream both through said armature and commutator and over the surfaces thereof and around the field windings and to be discharged through the other of said openings.

In witness whereof, I have hereunto set my hand this 16th day of January, 1912.

EDWARD D. PRIEST.

Witnesses:
    BENJAMIN B. HULL,
    HELEN ORFORD.